(12) United States Patent
Iryo et al.

(10) Patent No.: US 9,752,919 B2
(45) Date of Patent: Sep. 5, 2017

(54) LIQUID LEVEL DETECTION DEVICE

(71) Applicant: NIPPON SEIKI CO., LTD., Niigata (JP)

(72) Inventors: Hiroyuki Iryo, Niigata (JP); Yoshiyuki Shimazaki, Niigata (JP)

(73) Assignee: NIPPON SEIKI CO., LTD., Niigata (JP)

( * ) Notice: Subject to any disclaimer, the term of this patent is extended or adjusted under 35 U.S.C. 154(b) by 129 days.

(21) Appl. No.: 14/655,018

(22) PCT Filed: Dec. 12, 2013

(86) PCT No.: PCT/JP2013/083299
§ 371 (c)(1),
(2) Date: Jun. 23, 2015

(87) PCT Pub. No.: WO2014/103733
PCT Pub. Date: Jul. 3, 2014

(65) Prior Publication Data
US 2015/0338263 A1    Nov. 26, 2015

(30) Foreign Application Priority Data

Dec. 25, 2012 (JP) ................................. 2012-280957

(51) Int. Cl.
*G01F 23/32* (2006.01)
*G01F 23/38* (2006.01)
*F02M 37/00* (2006.01)

(52) U.S. Cl.
CPC ......... *G01F 23/32* (2013.01); *F02M 37/0082* (2013.01); *G01F 23/38* (2013.01)

(58) Field of Classification Search
CPC .......... G01F 23/32; G01F 23/38; G01F 23/34; G01F 23/36; G01F 23/74; G01F 23/76; F02M 37/0082

(Continued)

(56) References Cited

U.S. PATENT DOCUMENTS 7,520,167 B2 * 4/2009 Miyagawa ............... G01F 23/38
324/207.25
2005/0247128 A1 * 11/2005 Fukuhara ............ G01F 25/0061
73/313

(Continued)

FOREIGN PATENT DOCUMENTS

JP   2005-241553 A   9/2005
JP   2009-58248 A    3/2009

(Continued)

OTHER PUBLICATIONS

International Search Report PCT/JP2013/083299 dated Feb. 10, 2014 with English translation.

(Continued)

*Primary Examiner* — John Fitzgerald
*Assistant Examiner* — Truong Phan
(74) *Attorney, Agent, or Firm* — McDermott Will & Emery LLP

(57) ABSTRACT

Provided is a liquid level detection device which is configured so that an arm can be easily mounted to a holder after the holder is pivotably mounted using a cover and a main body portion. An end of a float arm is bent at a substantially right angle, and the end side of the float arm is defined as a first end portion. The portion of the float arm which is located closer to the center of the float arm than the first end portion is defined as a second end portion. A first arm mounting portion to which the first end portion is affixed and second arm mounting portions to which the second end portion is affixed are provided to a holder. A stopper for restricting the pivot range of the holder is provided to a main body portion. A first stopper which comes into contact with the stopper is provided to the holder. The first arm mounting portion and the first stopper are provided on a line passing (Continued)

through the pivot axis of the holder and perpendicular to the pivot axis.

1 Claim, 7 Drawing Sheets

(58) Field of Classification Search
USPC .................................................. 73/305, 317
See application file for complete search history.

(56) References Cited

U.S. PATENT DOCUMENTS

| 2007/0085532 A1* | 4/2007 | Miyagawa | G01F 23/38 |
| | | | 324/207.25 |
| 2008/0231267 A1* | 9/2008 | Miyagawa | G01F 23/38 |
| | | | 324/207.25 |

FOREIGN PATENT DOCUMENTS

| JP | 2009-244016 A | 10/2009 |
| JP | 2009-128195 A | 11/2009 |
| JP | 2010-203839 A | 9/2010 |

OTHER PUBLICATIONS

Extended European Search Report issued in corresponding EP Patent Application No. 13867092.2, dated Sep. 12, 2016.

* cited by examiner

LIQUID LEVEL DETECTION DEVICE

CROSS REFERENCE TO RELATED APPLICATIONS

This application is the U.S. National Phase of PCT/JP2013/083299 filed Dec. 12, 2013, which claims priority to Japanese Patent Application No. 2012-280957 filed Dec. 25, 2012. The subject matter of each is incorporated herein by reference in entirety.

TECHNICAL FIELD

The present invention relates to a liquid level detection device configured to detect a liquid level of a liquid, such as fuel in a fuel tank.

BACKGROUND ART

An exemplary related art liquid level detection device is disclosed in, for example, Patent Literature 1. This liquid level detection device rotatably holds a holder, configured to hold a float arm, by a main body portion and a cover.

CITED REFERENCE

Patent Literature

Patent Literature 1: JP-A-2009-58248 (see, especially, FIG. 2)

SUMMARY OF THE INVENTION

Problems to be Solved by the Invention

In the related art liquid level detection device, there is a problem that, if the main body portion and the cover are fixed in a state in which the holder is placed in the main body portion after the holder is attached to the float arm, the size of the liquid level detection device is increased because the holder is attached to the float arm and, in addition to that, the size of a facility of a production line in which the liquid level detection device is assembled is increased.

Then, before attaching the arm to the holder, the holder is placed in the main body portion, the main body portion and the cover are fixed to each other, the main body portion and the cover are fixed to each other, and, then, the float arm is attached to the holder. However, the operation to attach the arm to the rotatably held holder is difficult because the holder is held rotatably, and there is a problem in operability.

Then, the present invention focuses on the problem above, and an object thereof is to provide a liquid level detection device capable of easily attaching an arm to a holder after the holder is rotatably attached by a cover and a main body portion.

Means for Solving the Problem

A liquid level detection device according to the present invention, comprising: a float arm including a float at one end portion thereof; a holder configured to hold the float arm and including a first rotating portion and a second rotating portion; a main body portion including a first rotation support portion configured to rotatably support the first rotating portion; a cover including a second rotation support portion configured to rotatably support the second rotating portion; and a detecting portion, wherein, in the liquid level detection device configured to rotatably support the holder by the main body portion and the cover, by bending an end portion of the float arm at a substantially right angle to make an end portion side of the float arm be a first end portion and, make a central side of the float arm more than the first end portion be a second end portion, providing, in the holder, a first arm mounting portion configured to fix the first end portion, and a second arm mounting portion configured to fix the second end portion, providing, in the main body portion, a stopper configured to regulate a range of rotation of the holder, providing, in the holder, a first stopper configured to abut the stopper, and providing the first arm mounting portion and the first stopper on a line extending through an axis of rotation of the holder and extending in a direction vertical to the axis of rotation.

Further, the second arm mounting portion is provided between the first arm mounting portion and the first stopper, and each of angles among the first arm mounting portion, the first stopper, and the second arm mounting portion about an axis of rotation of the holder is set to be substantially right angle.

Effect of the Invention

With the configuration described above, the present invention can attain the expected object, and can provide a liquid level detection device capable of easily attaching an arm to a holder after the holder is rotatably attached by a cover and a main body portion.

MODE FOR CARRYING OUT THE INVENTION

Figure 1:
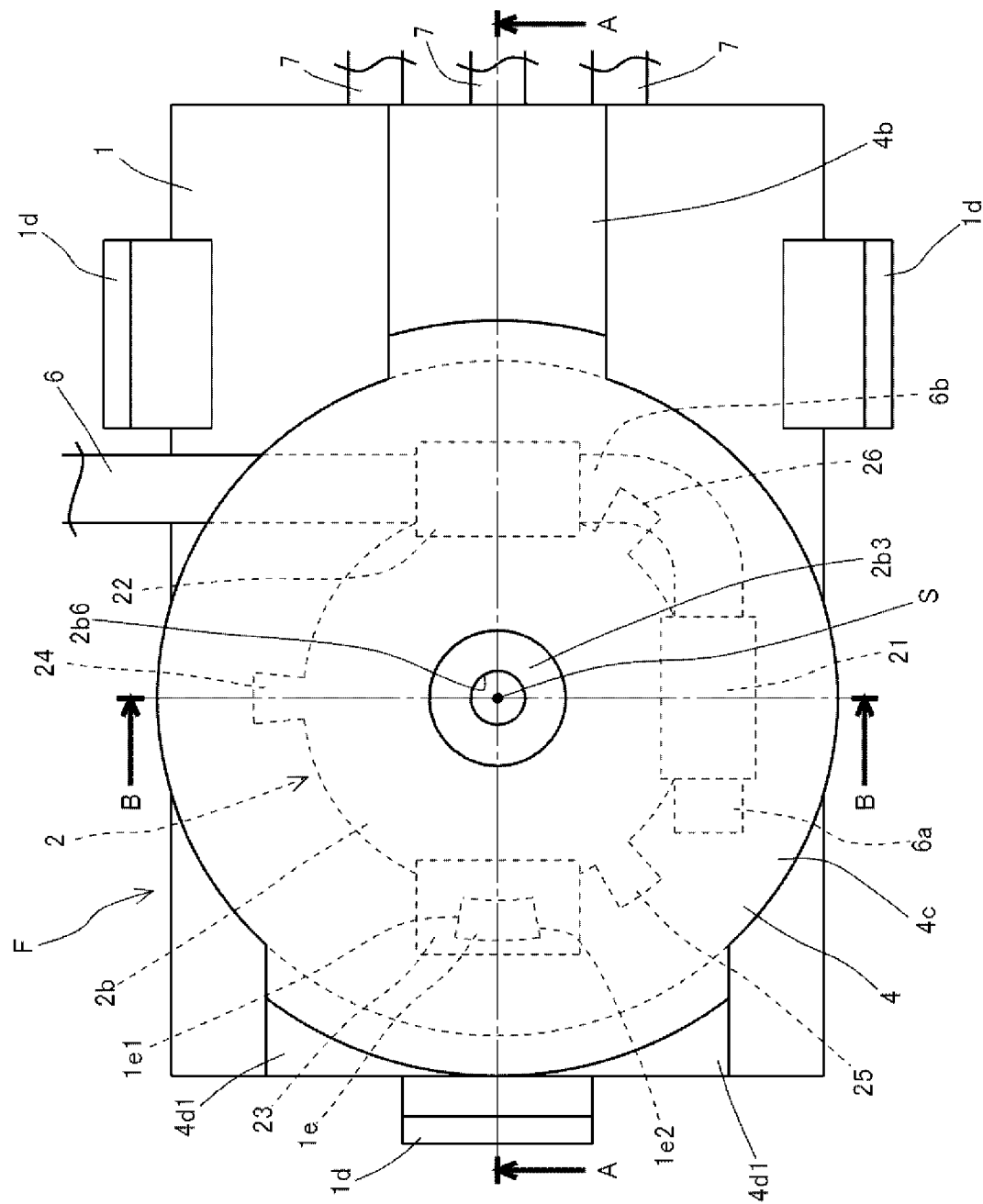
FIG. 1 is a top view of a liquid level detection device according to a first embodiment of the present invention.

Referring now to the attached drawings, a first embodiment of the present invention will be described.

A liquid level detection device F according to the present invention is configured to be installed in an unillustrated fuel tank that stores liquid fuel, such as gasoline.

The liquid level detection device F is formed mainly of a main body portion 1, a holder 2, a detecting portion 3, a cover 4, and a float arm 6 including a float.

The float arm 6 is formed of a metal wire, and includes, at one end portion thereof, a float floating at a liquid level of the liquid fuel in the fuel tank, and is attached to the holder 2 at the other end portion thereof. The end portion of the float arm 6 attached to the holder 2 is bent at a substantially right angle, and includes a first end portion 6a and a second end portion 6b. The first end portion 6a is located at an end portion side of the float arm 6, and the second end portion 6b is located on a central side of the float arm 6 more than the first end portion 6a. The float arm 6 transmits up-and-down motion of the float accompanying fluctuation of the liquid level to the holder 2.

The main body portion 1 is formed of a first resin body 11 and a second resin body 12.

The first resin body 11 is formed of a resin material, such as polyacetal (hereinafter, POM), and incorporates a plurality of terminals 1a by primary molding. The detecting portion (a magnetism detecting element) 3 and electronic components (a condenser and a resistance for noise absorption) 5 are mounted at a portion of the terminals 1a exposed from the first resin body 11.

The first resin body 11, on which terminals 1a the detecting portion 3 and the electronic components 5 are mounted, is insert-molded by the second resin body 12 formed of the same resin material as that of the first resin body 11, whereby the main body portion 1 is formed. The first resin body 11 is airtightly sealed by the second resin body 12 together with the terminals 1a, the detecting portion 3, and the electronic components 5.

The main body portion 1 includes a first rotation support portion 1b by which the holder 2 is supported rotatably. The first rotation support portion 1b is formed integrally with the second resin body 12. The first rotation support portion 1b has a columnar shape, and projects toward the holder 2 including a magnet 2a. The columnar shaped first rotation support portion 1b includes a sliding surface of which cross-sectional shape in a direction vertical to a direction of an axis of rotation S of the holder 2 is circular. Inside the main body portion 1 on the axis of rotation S of the first rotation support portion 1b, a magnetism detecting surface 3a of the magnetism detecting element, which is the detecting portion 3, is disposed in a state of opposing the magnet 2a.

The main body portion 1 includes, on a back surface side thereof (a side opposite to the side on which the holder 2 is provided), a positioning boss 1c configured to determine a position at which the main body portion 1 is attached to, for example, a fuel pump or an attachment stay, and the main body portion 1 includes, on a side surface thereof, a hook 1d with which the main body portion 1 is attached to, for example, the fuel pump or the attachment stay. Both the positioning boss 1c and the hook 1d are formed integrally with the second resin body 12.

The main body portion 1 further includes a stopper 1e configured to regulate a range of rotation of the holder 2. The stopper 1e includes stopper surfaces 1e1 and 1e2 in contact with a first stopper 24 and a second stopper 25, which are described later, provided in the holder 2.

A manufacturing method of the main body portion 1 includes insert-molding the mutually-connected plurality of terminals 1a in the first resin body 11 by primary molding, dividing the terminals 1a by pressing after the insert-molding, resistance welding or soldering the detecting portion 3 and the electronic components 5 to the divided terminals 1a, and secondarily molding the first resin body 11 by the second resin body 12. In the manufacturing method described above, the main body portion 1 is completed.

The holder 2 is formed of a resin material, such as POM, and the magnet 2a is fixed to the holder 2 by insert molding.

The magnet 2a is formed of, for example, a neodymium-ferrite material, has a columnar shape about the axis of rotation S of the holder 2, and is magnetized into two poles in the present embodiment.

The holder 2 includes a base portion 2b, a first rotating portion 2b2, a second rotating portion 2b3, a first arm mounting portion 21, second arm mounting portions 22 and 23, a first stopper 24, and second stoppers 25 and 26.

The base portion 2b has a disc shape, and is formed to expand in a radial direction about the axis of rotation of the holder 2 in the direction vertical to the direction of the axis of rotation S of the holder 2.

One first arm mounting portion 21 and two second arm mounting portions 22 and 23 are provided on an upper surface (an upper side surface in FIG. 2) of the base portion 2b. The first and the second arm mounting portions 21 and 22 are for attaching the float arm 6 configured to transmit motion of the float that moves in cooperation with fluctuation of the liquid level to the holder 2. A positional relationship among the first arm mounting portion 21 and the second arm mounting portions 22 and 23 is as follows: the first arm mounting portion 21 is located between the two second arm mounting portions 22 and 23, and angles between the first arm mounting portion 21 and the second arm mounting portion 22 and between the first arm mounting portion 21 and the second arm mounting portion 23 are substantially right angles about the axis of rotation S of the holder 2.

Figure 2:
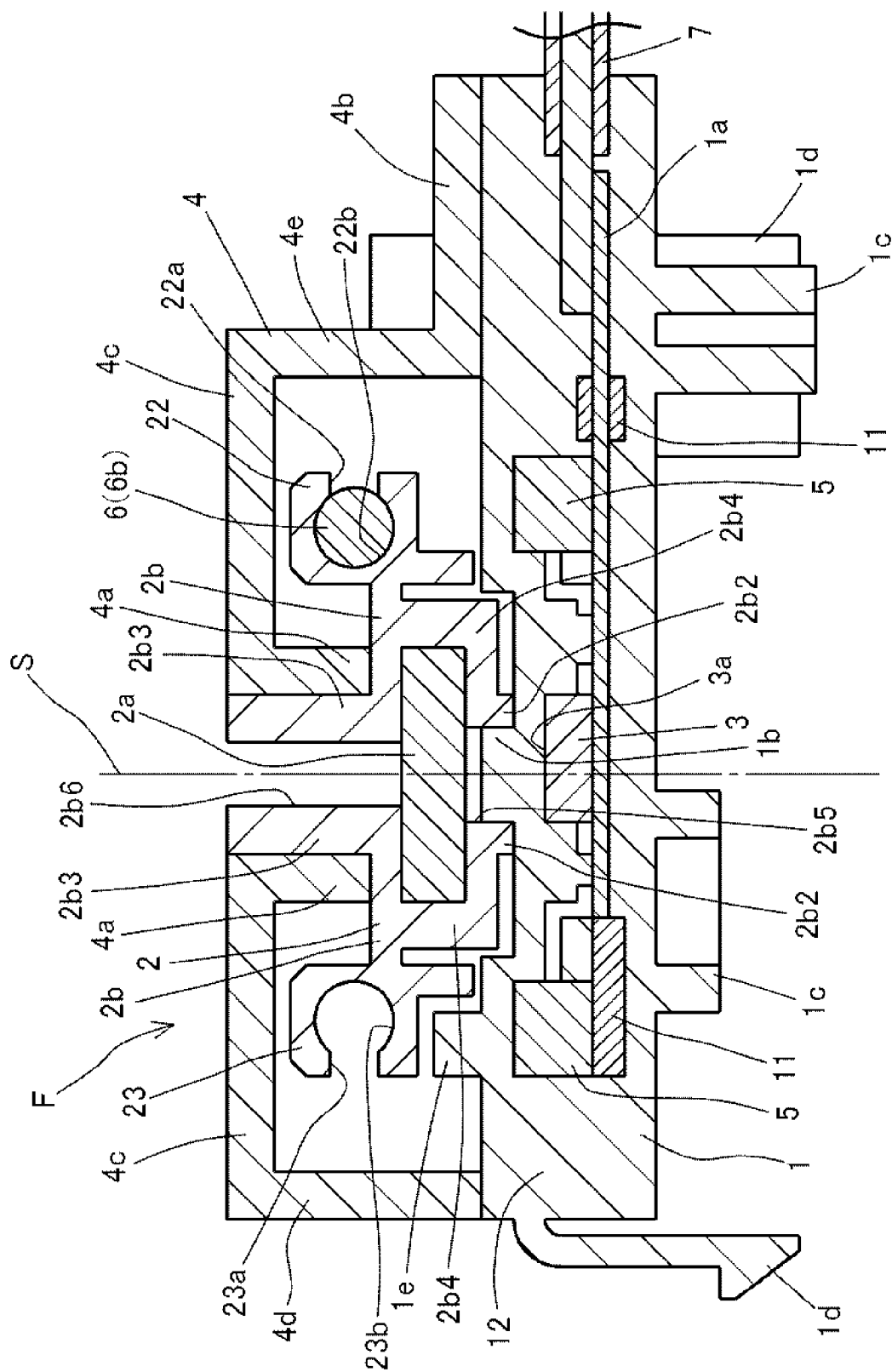
FIG. 2 is a cross-sectional view taken along the line A-A in FIG. 1.
Figure 3:
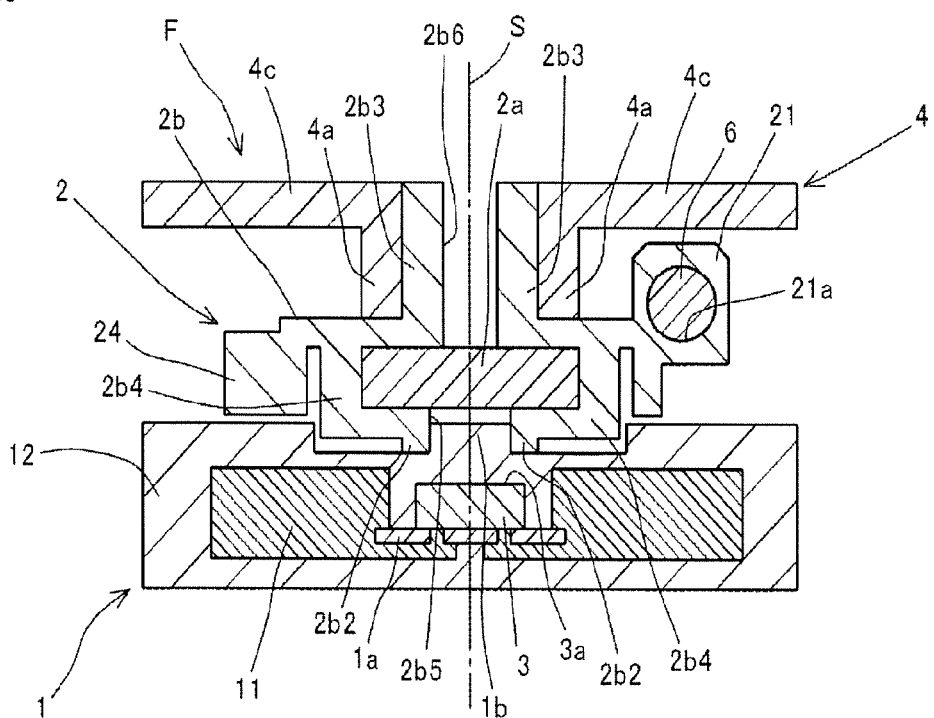
FIG. 3 is a cross-sectional view taken along the line B-B in FIG. 1.

The first arm mounting portion 21 is configured to fix the first end portion 6a, and the second arm mounting portions 22 and 23 are configured to fix the second end portion 6b. In the present embodiment, only the second arm mounting portion 22 is used for the fixation of the float arm 6, and the second arm mounting portion 23 is not used. The first arm mounting portion 21 includes a through hole 21a. The first end portion 6a is inserted in the through hole 21a and fixed. The second arm mounting portions 22 and 23 are depressions 22b and 23b including openings 22a and 23a in the direction vertical to the axis of rotation S. As illustrated in FIG. 2, the depressions 22b and 23b are circular arcs along an outer shape of the float arm 6, and a distance between the opening 22a and the opening 23a is formed to be shorter than a diameter of the float arm 6 to fix the second end portion 6b.

The float arm 6 is bent such that the first end portion 6a and the second end portion 6b make an angle of 90 degrees, and is disposed in the holder 2 at a position apart from the detecting portion 3, i.e., as illustrated in FIG. 2, disposed at an upper side of an upper surface of the magnet 2a provided in the holder 2, and outside of an outer periphery of the magnet 2a. With this configuration, an influence of magnetism caused by the process of the float arm 6 can further be reduced.

A holding portion 2b4 configured to hold the magnet 2a, and a first rotating portion 2b2 are provided on a lower surface of the base portion 2b.

The holding portion 2b4 has a cylindrical shape, and is narrowed so that the size thereof becomes smaller than an outer shape of the magnet 2a, and includes a first hole 2b5 through which the magnet 2a is exposed.

The first rotating portion 2b2 is provided below the holding portion 2b4. The first rotating portion 2b2 has a cylindrical shape, and a hole of the first rotating portion 2b2 is in communication with the first hole 2b5 of the holding portion 2b4. The first rotating portion 2b2 rotatably supports the holder 2 with a part of an inner peripheral surface of the cylindrical-shaped hole 2b5 functioning as a slide receiving surface that slides with a sliding surface on a columnar-shaped outer periphery of the first rotation support portion 1b of the main body portion 1.

In addition to the first and the second arm mounting portions 21, 22, and 23, a second rotating portion 2b3 is provided on the upper surface of the base portion 2b.

The second rotating portion 2b3 has a cylindrical shape, and includes a second hole 2b6 through which the magnet 2a is exposed. The second rotating portion 2b3 is located above the first rotating portion 2b2 via the magnet 2a in the direction of the axis of rotation of the magnet 2a. A central axis of the cylindrical-shaped first rotating portion 2b2 and a central axis of the second rotating portion 2b3 are disposed coaxially, and the axis of rotation of the magnet 2a is also located on the same axis. The second rotating portion 2b3 has a sliding surface of which cross-sectional shape is circular in a direction vertical to the direction of the axis of rotation S of the magnet 2a.

The holder 2 is configured such that, when the first rotating portion 2b2 is fit into the first rotation support portion 1b of the main body portion 1, the magnet 2a of the holder 2 is disposed to oppose the magnetism detecting surface 3a of the detecting portion 3, and changes in the magnetic poles of the magnet 2a accompanying the rotational operation of the holder 2 can be detected by the detecting portion 3. Further, by forming the main body portion 1 and the holder 2 of the same resin material, slidability of the holder 2 is improved.

Figure 4:
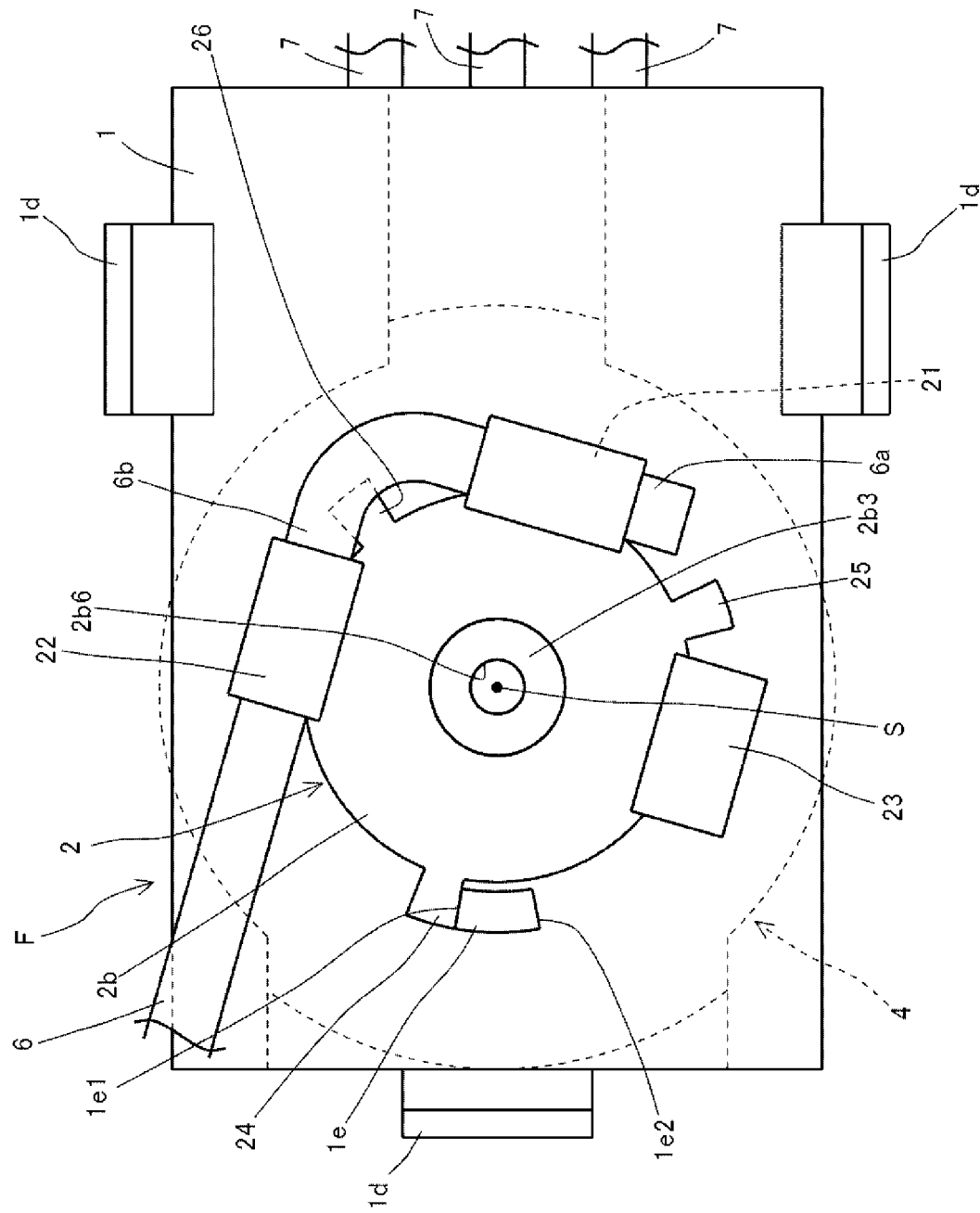
FIG. 4 is a top view of the liquid level detection device according to the first embodiment with a cover removed.
Figure 6:
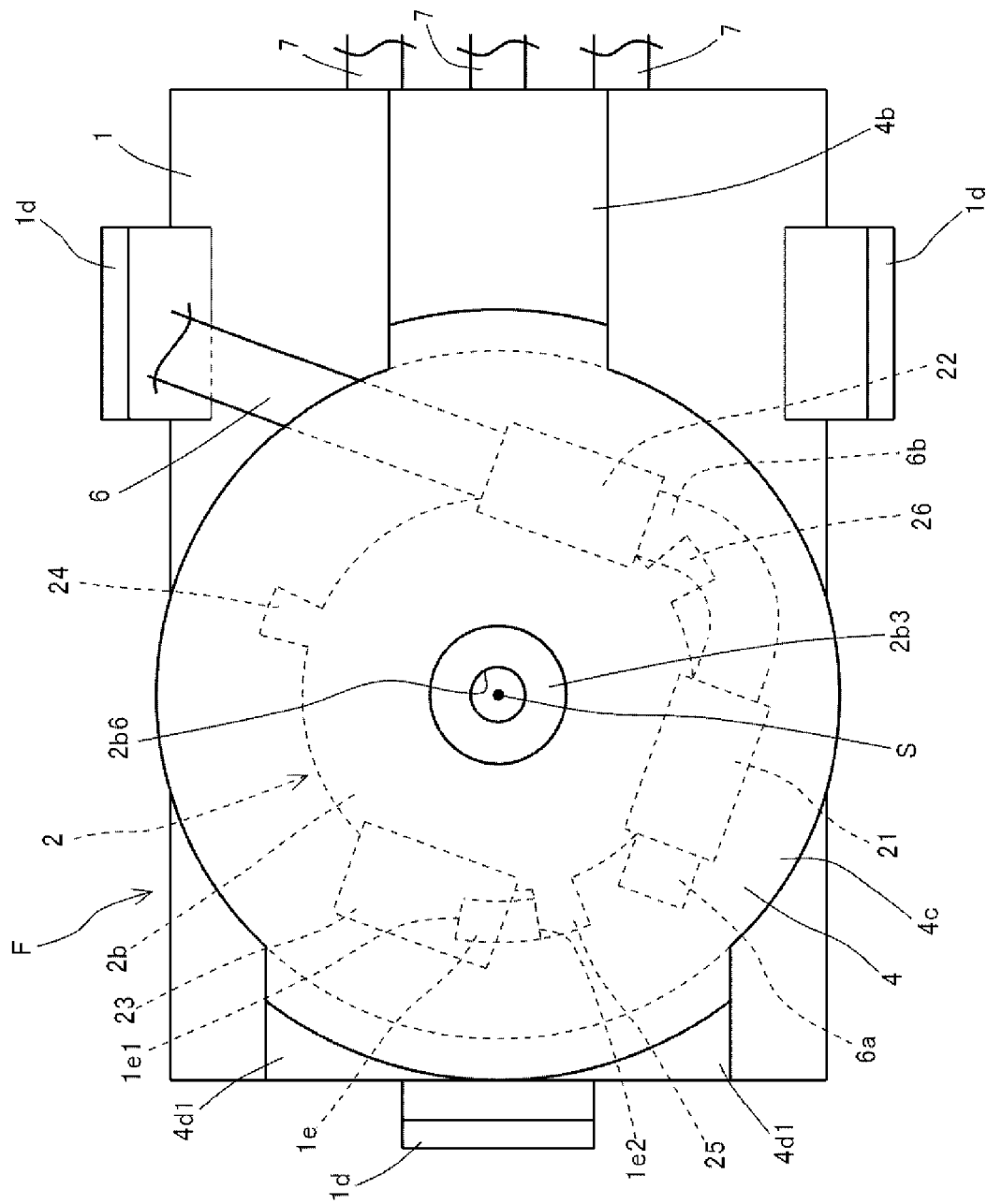
FIG. 6 is a top view of the liquid level detection device according to the first embodiment.

One first stopper 24 and two second stoppers 25 and 26 configured to abut the stopper 1e are provided on a side surface of the base portion 2b of the holder 2. In the case of the present embodiment, as illustrated in FIGS. 4 and 6, the stopper 1e is located between the first stopper 24 and the second stopper 25, the stopper 1e abuts the first stopper 24 and a range of rotation is regulated, the stopper 1e abuts the second stopper 24 and a range of rotation is regulated, and the holder 2 is rotatable between the first stopper 24 and the second stopper 25.

Further, a positional relationship between the first arm mounting portion 21 and the first stopper 24 is as follows: the first arm mounting portion 21 and the first stopper 24 are provided on a line extending through the axis of rotation S of the holder 2 and extending in the direction vertical to the axis of rotation S. That is, the first arm mounting portion 21 and the first stopper 24 are provided point-symmetrically about the axis of rotation S of the holder 2.

The second arm mounting portions 22 and 23 are provided between the first arm mounting portion 21 and the first stopper 24. Each of the angles made by the first arm mounting portion 21, the first stopper 24, and the second arm mounting portions 22 and 23 about the axis of rotation S of the holder 2 is a substantially right angle. That is, the angles that the first arm mounting portion 21 and the second arm mounting portions 22 and 23 make about the axis of rotation S are substantially right angles, and the angles that the second arm mounting portions 22 and 23 and the first stopper 24 make are also substantially right angles.

The detecting portion 3 is, for example, a magnetism detecting element, such as a Hall IC, and is electrically fixed to the terminals 1a by laser welding and resistance welding. Further, a power supply and a detection signal are transmitted to the detecting portion 3 by a lead wire 7 that is electrically connected to the terminals 1a.

The cover 4 is formed of a resin material, such as POM. The cover 4 is fixed to the main body portion 1 to prevent removal of the holder 2. The cover 4 includes a second rotation support portion 4a, a base portion 4b, a top plate portion 4c, a first wall portion 4d, and a second wall portion 4e.

As illustrated in FIG. 2, the cover 4 has a vertically inversed ladle shaped cross-section formed by the base portion 4b, the top plate portion 4c, and the first and the second wall portions 4d and 4e.

The second rotation support portion 4a is provided on the top plate portion 4c so as to project to the down side in FIG. 2. The second rotation support portion 4a has a cylindrical shape, and an inner peripheral surface thereof is a sliding surface that slides with a slide receiving surface on an outer periphery of the second rotating portion 2b3. The second rotation support portion 4a rotatably supports the second rotating portion 2b3.

The base portion 4b has a flat plate shape, is fixed to the main body portion 1, and is configured to fix the cover 4 to the main body portion 1. Fixation between the base portion 4b and the main body portion 1 is performed by a suitable means, such as laser welding.

The top plate portion 4c has a flat plate disc shape and, as illustrated in FIG. 1, when the liquid level detection device F is viewed from above, the top plate portion 4c has a shape in which upper and lower portions in FIG. 1 are omitted. The second rotation support portion 4a is provided at about the center of the top plate portion 4c.

The first and the second wall portions 4d and 4e are divided and, when the liquid level detection device F is viewed from above, each of the wall portions 4d and 4e has a circular arc shape. The float arm 6 is exposed from a portion at which the first and the second wall portions 4d and 4e are divided. A fixing piece 4d1 is provided at a lower end (a portion in contact with the main body portion 1) of the first wall portion 4d. The fixing piece 4d1 is, as well as the base portion 4b, fixed to the main body portion 1 by a suitable means, such as laser welding.

With the configuration described above, the first and the second rotating portion 2b2 and 2b3 disposed with the magnet 2a therebetween in the direction of the axis of rotation S of the magnet 2a are provided in the holder 2, the detecting portion 3 is disposed to oppose the magnet 2a in the direction of the axis of rotation S of the magnet 2a and, at the same time, the first rotation support portion 1b configured to rotatably support the first rotating portion 2b2 of the holder 2 is provided in the main body portion 1, and the holder 2 is rotatably supported by the main body portion 1 and the cover 4, which is fixed to the main body portion 1 and includes the second rotation support portion 4a configured to rotatably support the second rotating portion 2b3 of the holder 2. Further, after the cover 4 is attached to the main body portion 1, the float arm 6 is attached to the holder 2.

Figure 5:
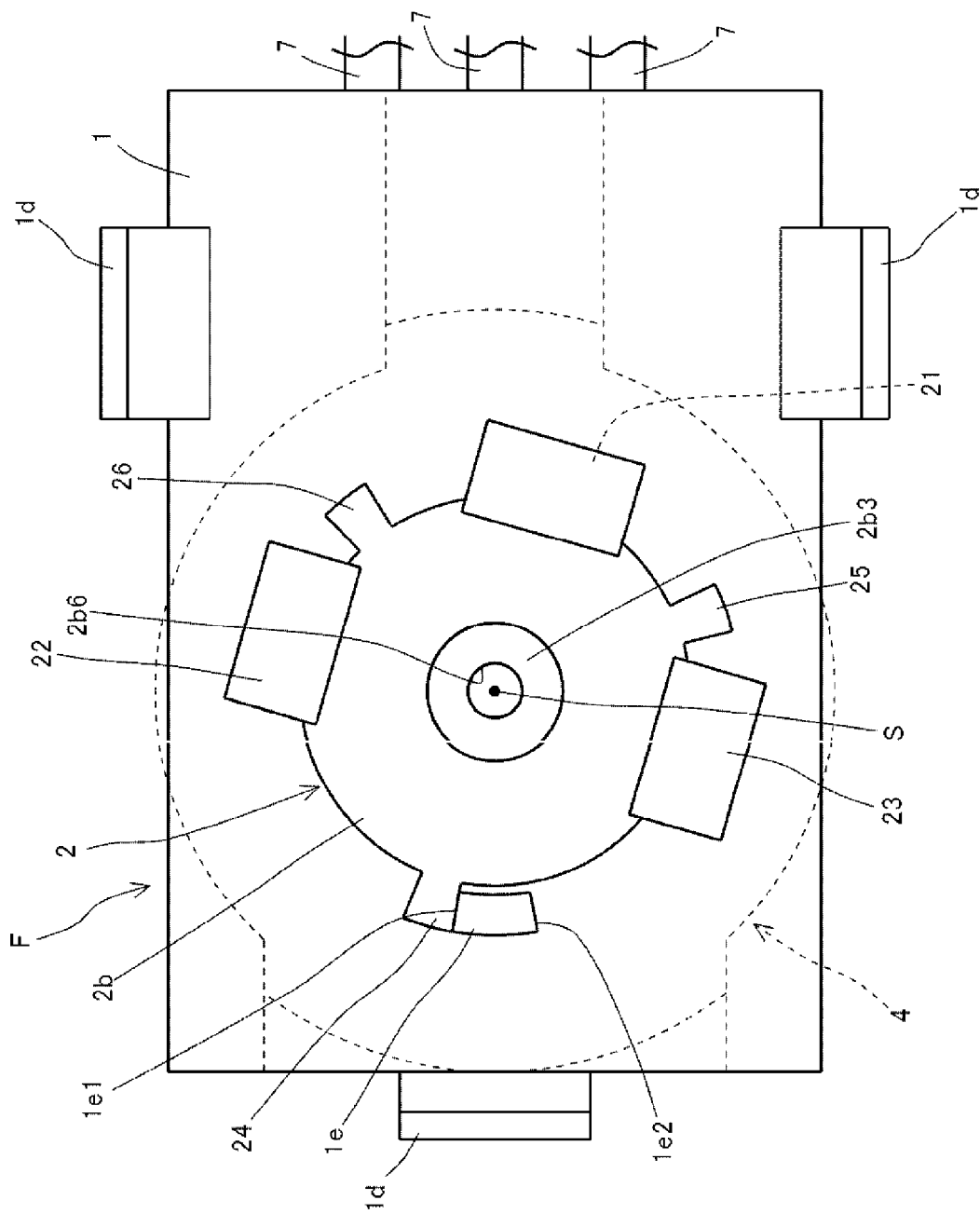
FIG. 5 is a top view of the liquid level detection device according to the first embodiment with the cover and a float arm removed.

Next, the float arm 6 is attached to the holder 2 as follows: first, the first stopper 24 is made to abut the stopper 1e to prevent rotation of the holder 2 (see FIG. 5). Next, while inserting the first end portion 6a of the float arm 6 in the first arm mounting portion 21, the second end portion 6b is pressed against the opening 22a of the second arm mounting portion 22, and the second end portion 6b is attached to the depression 22b of the second arm mounting portion 22. When the second end portion 6b is to be attached to the depression 22b of the second arm mounting portion 22, since the first arm mounting portion 21 and the first stopper 24 are provided on a line extending through the axis of rotation S of the holder 2 and extending in the direction vertical to the axis of rotation S, the first stopper 24 abuts the stopper 1e to prevent rotation of the holder 2, whereby the float arm 6 can easily be attached to the holder 2.

Since the second arm mounting portion 22 is provided between the first arm mounting portion 21 and the first stopper 24, and each of the angles made by the first arm mounting portion 21, the first stopper 24, and the second arm mounting portion 22 about the axis of rotation S of the holder 2 is set to be the substantially right angle, rotation of holder 2 is prevented by the first stopper 24 abutting the stopper 1e, and, since a direction in which the first end portion 6a of the float arm 6 is inserted in the first arm mounting portion 21, and a direction in which the second end portion 6b is attached to the second arm mounting portion 22 can be made the same, rotation of the holder 2 can be prevented and the holder 2 can be easily attached to the float arm 6.

Figure 7:
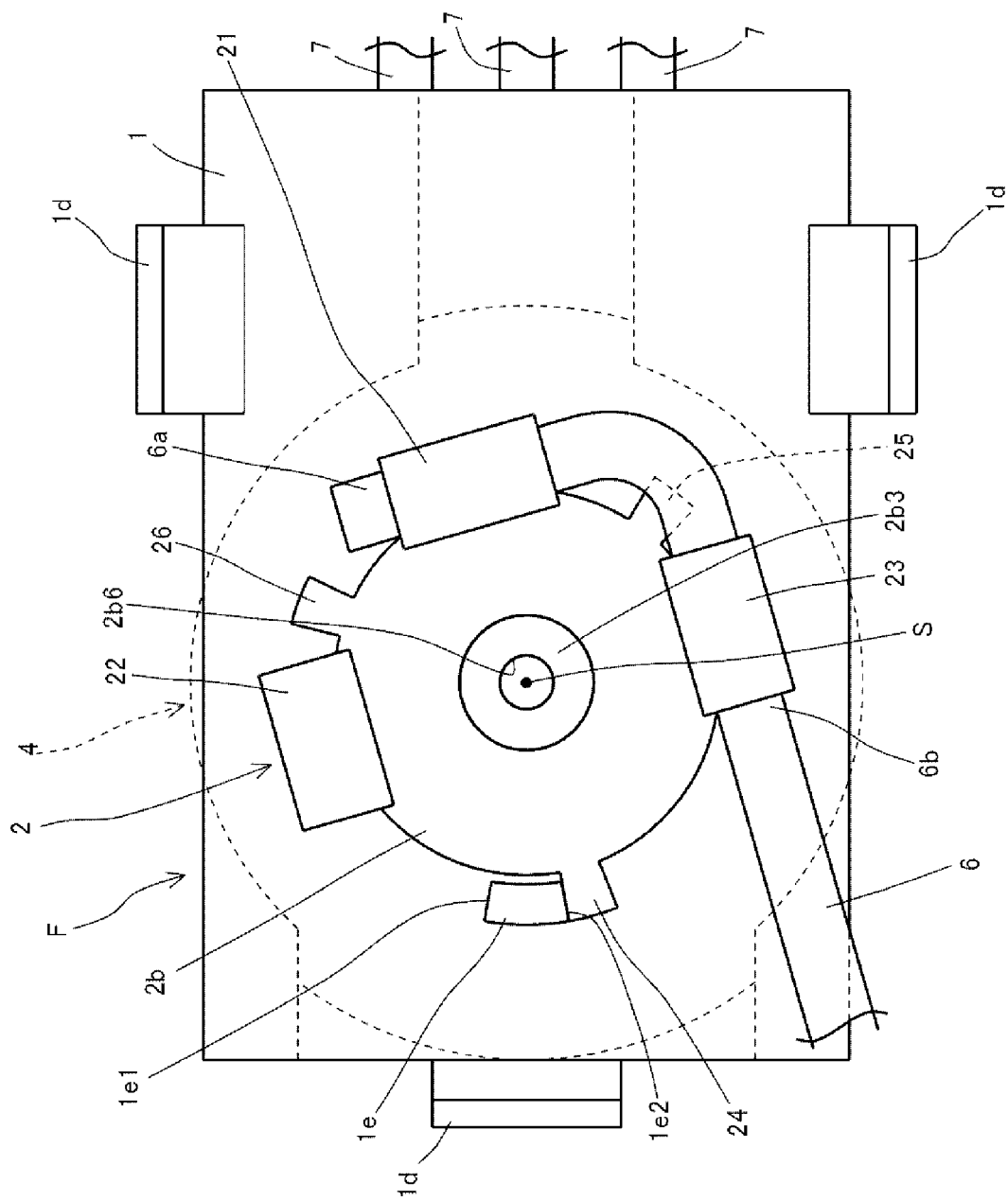
FIG. 7 is a top view of a liquid level detection device according to a second embodiment of the present invention with a cover removed.

In the first embodiment, as illustrated in FIG. 1, the float arm 6 extends upward in the drawing from the liquid level detection device F. However, for example, as illustrated in FIG. 7, it is also possible to configure such that the float arm 6 extends downward in the drawing from the liquid level detection device F. In this case, it is only necessary that the float arm 6 is attached to the holder 2 by the first arm mounting portion 21 and the second arm mounting portion 23, the holder 2 is assembled to the liquid level detection device F such that the stopper 1e is located between the first stopper 24 and the second stopper 26 of the holder 2 and, at the same time, the float arm 6 is attached by the first arm mounting portion 21 and the second arm mounting portion 23.

The above description is illustrative only and various changes and modifications may be made without departing from the scope of the present invention. In the present embodiment, the first rotation support portion 1b of the main body portion 1 may include the sliding surface of which cross-sectional shape in the direction vertical to the direction of the axis of rotation S of the magnet 2a is circular, and the first rotating portion 2b2 may include the slide receiving surface configured to rotatably support the outer periphery of the sliding surface. Alternatively, the second rotation support portion 4a may include a sliding surface of which cross-sectional shape in the direction vertical to the direction of the axis of rotation S of the magnet 2a is circular, and the second rotating portion 2b3 may include a slide receiving surface configured to rotatably hold the outer periphery of the sliding surface.

In the embodiment described above, the detecting portion 3 is configured to detect a change in the magnetic force of the magnet 2a accompanying the rotation of the holder 2. However, the invention is not limited to the present embodiment, but the detecting portion 3 may detect an electrical change accompanying the rotation of the holder 2.

INDUSTRIAL APPLICABILITY

The present invention is applicable to a liquid level detection device configured to detect a liquid level of various liquids in a fuel tank.

REFERENCE NUMERALS

F liquid level detection device
1 main body portion
1a terminal unit
1b first rotation support portion
1c positioning boss
1d hook
1e stopper
2 holder
2a magnet
2b base portion
2b2 first rotating portion
2b3 second rotating portion
2b4 holding portion
2b5 first hole
2b6 second hole
21 first arm mounting portion (arm mounting portion)
21a through hole
22 second arm mounting portion (arm mounting portion)
22a opening
22b depression
23 second arm mounting portion
23a opening
23b depression
24 first stopper
25 second stopper
26 second stopper
3 detecting portion (magnetism detecting element)
3a magnetism detecting surface
4 cover
4a second rotation support portion
4b base portion
4c top plate portion
4d first wall portion
4e second wall portion
5 electronic component
6 float arm
6a first end portion
6b second end portion
7 lead wire
11 first resin body
12 second resin body
S axis of rotation

The invention claimed is:

1. A liquid level detection device comprising:
a float arm;
a holder configured to rotate about a rotation axis and including a first rotating portion and a second rotating portion;
a main body portion including a first rotation support portion configured to rotatably support the first rotating portion;
a cover including a second rotation support portion configured to rotatably support the second rotating portion, wherein the main body portion and the cover are configured to rotatably support the holder; and
a detecting portion,
wherein,
the float arm comprises a first portion and a second portion, the first portion extends from one end of the second portion at a right angle, and a float is disposed at the other end of the second portion,
the main body portion comprises a stopper configured to regulate a range of rotation of the holder,
the holder comprises a first arm mounting portion, a second arm mounting portion, and a first stopper on an outer peripheral surface of the holder in that order, the first arm mounting portion includes a through hole and configured to fix the first portion of the float arm by inserting the first portion through the through hole, the second arm mounting portion includes an opening and configured to fix the second portion of the float arm with the opening, the first stopper configured to abut the stopper,
in axial plane view of the holder:
the first arm mounting portion, the rotation axis of the holder, and the first stopper are disposed in that order along a first straight hypothetical line running through the rotation axis of the holder;
the second arm mounting portion is disposed on a second straight hypothetical line running through the rotation axis of the holder; and the first straight hypothetical line and the second straight hypothetical line form a right angle at the rotation axis of the holder, the through hole of the first arm mounting portion has an axis extending in a direction parallel to the second straight hypothetical line, and the opening of the second arm mounting portion is open along a direction parallel to the first straight hypothetical line.

\* \* \* \* \*